UNITED STATES PATENT OFFICE.

JOHN DOUGLAS AND THOMAS D. DOUGLAS, OF SAN FRANCISCO, CAL.

PREPARATION OF LIME-JUICE.

SPECIFICATION forming part of Letters Patent No. 228,881, dated June 15, 1880.

Application filed September 9, 1879.

*To all whom it may concern:*

Be it known that we, JOHN DOUGLAS and THOMAS D. DOUGLAS, of the city and county of San Francisco, and State of California, have invented a Lime-Juice Compound; and we hereby declare the following to be a full, clear, and exact description thereof.

This invention relates to a compound which is intended for making lemonade, seasoning, &c., to take the place of limes; and it consists in mixing certain proportions of sugar, glycerine, water, lime-juice, and sulphuric acid, so as to form a compound with the characteristics of lime-juice, while at the same time it is always ready for use and is self-preservative.

To prepare the compound we dissolve twenty-five pounds of sugar in three gallons of hot water, and while hot add one pound of glycerine. Then to this still heated compound we add two gallons of lime-juice and stir the whole up together, afterward filtering it; then four ounces of sulphuric acid, to preserve it from decomposition and prevent any change, and the mixture is again filtered to remove any foreign substances. The addition of the sulphuric acid preserves the mixture without the use of any spirituous liquids.

The compound is useful for making lemonade, and for family and bar-room use, being designed to take the place of limes or lemons. It is agreeable to the taste, will not decompose with age, and is always ready for use. It is put up in bottles of convenient size, and has the appearance of ordinary lime-juice.

Having thus described our invention, what we claim as new, and desire to secure by Letters Patent, is—

A compound consisting of a mixture of sugar, glycerine, water, lime-juice, and sulphuric acid, in about the proportions set forth.

In witness whereof we have hereunto set our hands.

JOHN DOUGLAS.
THOS. D. DOUGLAS.

Witnesses:
  CHAS. G. YALE,
  S. H. NOURSE.